United States Patent

[11] 3,578,765

[72] Inventors  Tatsuo Kobayashi
               Kaizuka
               Kayoshi Tsujimoto, Higashi, Osaka, Japan
[21] Appl. No. 720,091
[22] Filed     Apr. 10, 1968
[45] Patented  May 18, 1971
[73] Assignee  Minolta Camera Kabushiki Kaisha
               Osaka, Japan
[32] Priority  Apr. 12, 1967, Apr. 13, 1967, Apr. 28, 1967
[33]           Japan
[31]           42/23064, 42/30516 and 42/27300

[54] ELECTRIC EYE CAMERA
     13 Claims, 15 Drawing Figs.
[52] U.S. Cl. .................................................. 95/10,
                                                     95/53, 95/64
[51] Int. Cl. .................................................. G03b 7/12,
                                                     G03b 9/00

[50] Field of Search........................................... 95/10 (C),
                                                              53, 64

[56]                References Cited
                UNITED STATES PATENTS
3,131,619  5/1964   Rentschler ................... 95/10(C)
3,286,610  11/1966  Fahlenberg................... 95/10(C)
3,318,214  5/1967   Singer et al. .................. 95/10(C)

Primary Examiner—John M. Horan
Assistant Examiner—Joseph F. Peters, Jr.
Attorney—Prangley, Clayton, Mullin, Dithmar & Vogel ABSTRACT: An electric eye camera to be operated either in a programmed exposure control mode or in an automatic exposure control with priority on shutter speed mode. The camera has a changeover ring to facilitate selection of the mode by simple operation. A lens aperture control ring is used to inhibit the mode of operation with priority on shutter speed as long as the lens aperture control ring is away from its initial position.

INVENTORS
TATSUO KOBAYASHI
BY KAYOSHI TSUJIMOTO

Mullin & Siegel

INVENTORS
TATSUO KOBAYASHI
KAYOSHI TSUJIMOTO
BY Mullin & Siegel

INVENTORS
TATSUO KOBAYASHI
KAYOSHI TSUJIMOTO
BY
Mullin & Siegel

INVENTORS
TATSUO KOBAYASHI
KAYOSHI TSUJIMOTO
BY Mullin & Siegel

INVENTORS
TATSUO KOBAYASHI
KAYOSHI TSUJIMOTO
BY
Mullin & Siegel

ELECTRIC EYE CAMERA

This invention relates to an electric eye camera, and more particularly to an electric eye camera capable of automatic exposure control with priority on shutter speed as well as programmed exposure control, which has a lens aperture control ring and a program ring to be rotated by the stroke of shutter means.

A known electric eye camera, capable of both automatic exposure control with priority on shutter speed and programmed exposure control, has a program ring, a lens aperture control ring and a cam portion formed at a certain part of the periphery of the aperture control ring, so that during the programmed exposure control, the rotation of the aperture control ring directly causes variation of the degree of the lens aperture by moving aperture blades having one end pivoted to said program ring, and at the same time, said rotation changes the shutter speed by rotating said program ring in the same direction as said lens aperture control ring by means of said cam and a driven element engaged with said cam, while modifying the variation of the degree of lens aperture depending on the amount of change in the shutter, so as to provide the desired quantity of light. In this case, the lens aperture control ring and the program ring form a differential device. For the operation of automatic exposure control with priority on the shutter speed, the engagement between the cam and the driven element is released, so as to hold the program ring stationary and to determine the proper exposure by the control of the degree of lens aperture alone.

The programmed exposure control system is convenient for beginners, because proper exposure can be determined automatically simply by depressing a shutter button. However, the programmed exposure control system has a disadvantage in that delicate control based on advanced photographic techniques cannot be applied, because both the exposure time and the lens aperture are determined automatically at definite values, depending on the brightness of each object to be shot. On the other hand, in the case of the automatic exposure control system with priority on shutter speed, a shutter speed should be set for each shooting, and the range available for lens aperture control is limited. Furthermore, advanced photographic techniques, such as expression of dynamic movement on the picture and a still shot of a quickly moving object, can hardly be applied to such automatic exposure control system.

Accordingly, there has been a demand for cameras of simple construction and yet capable of carrying out both the programmed exposure control and the automatic exposure control with priority on shutter speed. In fact a number of structures for such cameras have been proposed heretofore. However, such known cameras have disadvantages in that their operative mechanism is very complicated, because the selection of either one of the two exposure control systems is done by switching a part of the internal mechanism of the shutter, or by switching a mechanism interconnected with an ammeter.

Therefore, an object of the present invention is to overcome or obviate the aforesaid difficulties of known electric eye cameras, by providing an improved electric eye camera of very simple construction which is capable of both programmed exposure control and automatic exposure control with priority on shutter speed. In the electric eye camera, according to the present invention, the selection between the aforesaid two exposure control systems can be made simply by operating a changeover ring, and a program ring can be especially smoothly rotated for modifying the shutter speed during the programmed exposure control mode operation, and the danger of misoperation is eliminated by prohibiting changeover from the programmed exposure control mode operation to other mode operation as long as a lens aperture control ring is away from its initial position.

Another object of the present invention is to provide an electric eye camera having an exposure indicating means adapted to indicate either the light value of a photographic object or the degree of lens aperture, which indicating means is mounted on the pointer of a built-in ammeter, so that the movement of said pointer is brought into the field of a view finder to indicate the light value during the programmed exposure control mode operation and the degree of lens aperture during the automatic exposure control with priority on shutter speed mode operation.

A further object of the present invention is to provide an electric eye camera, including an electric circuit adapted to facilitate performance and selection of the programmed exposure control and the automatic exposure control with priority on shutter speed, wherein the operative characteristics of the electric circuit are matched with the prescribed program of the shutter speed and the degree of lens aperture, so as to minimize the error in the exposure.

Other objects and a fuller understanding of the present invention may be had by referring to the following description and claims, taken in conjunction with the accompanying drawings, in which:

Like parts are designated by like numerals and symbols throughout the drawings.

Figure 1:
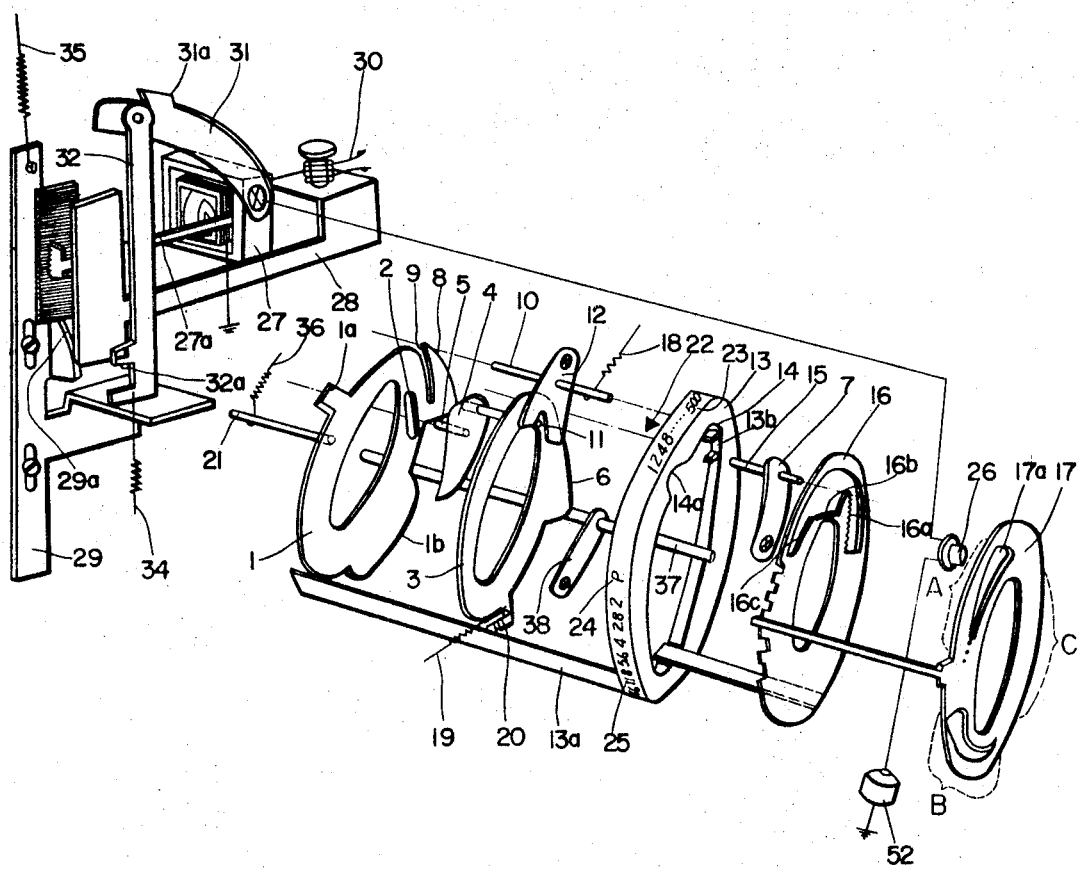
FIG. 1 is an exploded perspective view of an electric eye camera, according to the present invention.

Referring to FIG. 1, an aperture control cam 2 is mounted on a lens aperture control ring 1. A lens aperture blade 4 is pivotally supported by a program ring 3 at one end thereof, and a pin 5 is secured to the blade 4 in such manner that the cam 2 on the lens aperture control ring 1 is operatively engaged with the pin 5. Another cam 6 is formed integrally with the program ring 3, and when the program ring moves away from its initial position, the cam 6 engages the pin 15 of a shutter delaying mechanism 7, so as to determine shutter speed.

Another cam 8 is integrally formed on the lens aperture control ring 1, with an escape groove 9 bored between the ring 1 and the cam 8. The escape groove 9 is concentric with the ring 1 and connected thereto at one end thereof. One end of the driven element 10 of a changeover lever 12 is engageable with the escape groove 9. The opposite end of the driven element 10 operatively engages with an inner cam portion 14 formed on the inner periphery of a changeover ring 13. The changeover lever 12 has a bifurcated portion, engageable with a driven pin 11 secured to the program ring 3. The inner cam portion 14 has a recess 14a. The shutter delaying mechanism 7 has a pin 15 secured thereto, which is engageable with any one of cam portions 16a, 16b, and 16c of a shutter speed ring 16 coaxially secured to the changeover ring 13. The changeover ring 13 has an axially-directed portion 13a, which engages a lug 1a of the lens aperture control ring 1 during flash photographing. A spring 18 is connected to the driven element 10 of the changeover lever 12, so as to bias the lever 12 away from the program ring 3. Another spring 19 is connected to the program ring 3 to pull it toward a stopper 20. Index point 22 is shown by a chain line in the FIG., and it can index a series of shutter speed, marks 23, e.g. numerals inscribed on the changeover ring 13 to indicate various shutter speeds, a program mark, e.g. a letter P inscribed on the changeover ring 13, and a flash mark 25, e.g. numerals inscribed on the changeover ring 13 to indicate the degree of lens aperture or flash bulb guide numbers. When the driven element 10 of the changeover lever engages the recess 14a of the inner cam portion 14 of the changeover ring 13, the program mark 24 is indexed, to indicate that the programmed exposure control mode is selected. If the degree of lens aperture is used as the flash mark 25, the lens aperture can be controlled manually during flash photographing. On the other hand, if flash bulb guide numbers are used as the flash mark, automatic flash photographing can be done by a suitable known method.

A front lens aperture ring 17 has a through hole means 17a, through which light beams from a photographic object reach a photoelectric element 26. An ammeter 27 is driven by the output from the photoelectric element 26. The through hole means 17a has A and B holes. A hole is used during the automatic exposure control mode with priority on shutter speed, so as to provide for adjustment for different film sensitivities and for selection of desired shutter speed. The hole B is used during the programmed exposure control mode to provide for adjustment for different film sensitivities. The front lens aperture control ring 17 has a solid portion C, which is used during flash photographing, so that the light beams to the photoelectric element 26 from the photographic object are completely interrupted there. As will be described hereinafter, the reading of the ammeter 27 is minimized during the flash photographing.

An exposure pointer holding lever 28 is biased by a spring 30 in a clockwise direction, as seen in FIG. 1. Normally, the pointer holding lever is kept away from a pointer 27a of the ammeter 27 by the bent portion 29a of a shutter release lever 29. When the shutter release lever 29 is depressed against the elastic force of a spring 35, the pointer holding lever 28 is freed from bent portion 29a of the shutter release lever 29, so that the pointer 27a of the ammeter is retained at the then angular position by holding the free end of the pointer between a stationary member and the operative portion of the pointer holding lever 28. The spring 30 acts to hold the pointer holding lever 28 as forced against the stationary member so as to retain the pointer 27a between them. At the same time, an ammeter interconnecting lever 32 moves down, as the shutter release lever 29 is depressed, by the elastic force of a spring 34. Accordingly, an arm 32a of the bifurcated portion of the ammeter interconnecting lever 32 comes into engagement with an exposure interconnecting pin 21 secured to the lens aperture control ring 1 A spring 36 is provided to bias the lens aperture control ring 1 in a clockwise direction. As shown in the FIG., the downward movement of the ammeter interconnecting lever 32 will cause counterclockwise rotation of the lens aperture control ring 1 against the elastic force of the spring 36, by the engagement between the arm 32a and the pin 21.

The upper end of the ammeter interconnecting lever 32 is connected to the free end of a pointer scanning lever 31, which is pivotally supported by the ammeter 27 at the opposite end thereof. The pointer scanning lever 31 has a bent portion 31a engageable with the pointer 27a. As the ammeter interconnecting lever 32 descends, the pointer scanning lever 31 rotates counterclockwise around its pivoted end thereof, until the bent portion 31a engages with the pointer 27a retained by the pointer holding lever 28. Thus, the downward movement of the ammeter interconnecting lever 32 ends, so as to stop the lens aperture control ring 1 at an angular position proportional to the angular position of the pointer 27a, which is in turn proportional to the brightness of the photographic object. In other words, an exposure value, e.g. lens aperture, which is proportional to the brightness of the photographic object can be achieved.

Upon completion of photographing, the shutter release lever 29 is freed from depressive force, and the lever 29 moves upwards by the elastic force of the spring 35. The elastic force of the spring 35 is so selected as to be larger than that of the spring 34, so that as the lever 29 moves upwards, the ammeter interconnecting lever 32 also moves back to its original position, together with the pointer scanning lever 31. At the same time the pointer holding lever 28 is rotated away from the pointer 27a to free the latter, and the lens aperture control ring 1 resumes its original position. In such way, the photographing process is completed, and the camera is ready for the next shooting.

Figure 2:
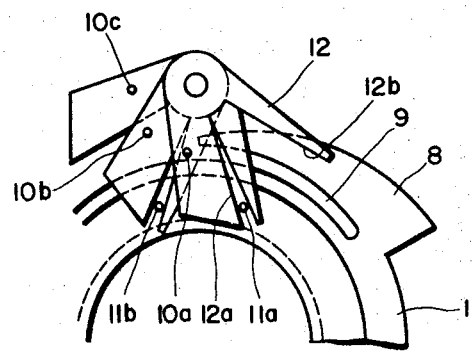
FIG. 2 is a diagrammatic illustration of the relation between a changeover lever and a program ring in the automatic exposure control device mounted on the electric eye camera of FIG. 1.

FIG. 2 shows the relation among the driven element 10, the driven pin 11, the changeover lever 12, the program ring 3, and the escape groove 9. During the automatic exposure control with priority on shutter speed mode operation, the internal cam 14 of the changeover ring 13 forces the driven element 10 downwards to a position, as shown as 10a in the FIG., where the driven element can engage in the escape groove 9 of the lens aperture control ring 1. As the changeover lever 12 rotates counterclockwise, one arm 12a engages with the driven pin 11 secured to the program ring 3, so as to turn the program ring in a clockwise direction, until the latter engages with the stopper 20. The position of the driven pin 11 when the program ring 3 is thus stopped is shown by 11a in the figure.

Then, if the changeover ring 13 is turned to the programmed exposure control position, the recess 14a comes to a position engageable with the driven element 10, to allow the upward movement of the driven element which is caused by the spring 18. Since the elastic force of the spring 19 is selected to be larger than that of the spring 18, when the changeover lever 12 moves counterclockwise, it stops as soon as the other arm 12b of its bifurcated portion engages with the driven pin 11 at the position 11a. Then, the driven element 10 of the changeover lever 12 stops at the position, as illustrated by 10b in the FIG., where the driven element 10 is engageable with the cam 8 of the lens aperture control ring 1.

The operation of the automatic exposure control with priority on shutter speed will be described first. One of the shutter speed marks 23 is brought to the position of the index point 22, by turning the changeover ring 13, so that the cam portion 16a of the shutter speed ring 16 engages the pin 15 secured to the shutter delaying mechanism 7. Thus, shutter speed is set. With the changeover ring 13 thus turned, the internal cam surface 14 of the ring 13 forces the driven element 10 to a position engageable with the escape groove 9 of the lens aperture control ring 1, so as to disengage the driven element 10 from the cam 8 of the ring 1. Accordingly, the lens aperture control ring 1 can rotate by itself to set a lens aperture proportional to the brightness of the photographic object for the shutter speed thus set by turning the changeover ring 13. Under such conditions, the program ring 3 remains at its initial position, regardless of the rotation of the lens aperture control ring 1, and the cam 6 of the program ring 3 does not engage with the pin 15 of the shutter speed delaying mechanism. In this mode of operation, the hole A of the through hole means 17a of the front lens aperture ring 17 is used, while allowing the adjustment for different shutter speeds and different film sensitivity.

For programmed exposure control, the changeover 13 is so turned as to bring the program mark 24 to the position of the index point 22. Then, the driven element 10 is moved to a position where it is engageable with the cam 8 of the lens aperture control ring 1, so that as the lens aperture control ring 1 rotates, the cam 8 drives the changeover lever 12 in a clockwise direction through the driven element 10 secured thereto. The changeover lever 12, in turn, causes counterclockwise rotation of the program ring 3 through the driven pin 11, so that the cam 6 of the program ring 3 activates the shutter delaying mechanism 7 through the pin 15. Thus, the shutter speed is also controlled by the rotation of the lens aperture control ring 1, in the case of program exposure control mode of operation.

It should be noted here that a known electric eye camera, capable of both the programmed exposure control mode and the automatic exposure control with priority on shutter speed mode, also has a lens aperture control ring and a program ring 3, similar to the rings 1 and 3 of the aforesaid embodiment, respectively. However, in the known electric eye camera, the program ring is connected to the lens aperture control ring through a spring, so that the program ring will follow the lens aperture control ring through a spring, so that the program ring will follow the lens aperture control ring in motion. On the other hand, according to the present invention, there is no spring used for connecting the program ring 3 to the lens aperture control ring 1, but the former is related to the latter through the changeover lever 12. Such difference in the connection between the lens aperture control ring 1 and the program ring 3 results in significant variation in the performance of the camera.

As described in the foregoing, with the electric eye camera of the present invention, the changeover lever 12 with a bifurcated end portion is used, so that for the mode of automatic exposure control with priority on shutter speed, one arm 12a of the bifurcated portion of the changeover lever 12 acts to hold the program ring 3 stationary. While, for the mode of programmed exposure control, as the lens aperture control ring 1 rotates, the changeover lever 12 is also rotated through the cam 8 of the ring 1 and the driven element 10 of the lever 12, so that the other arm 12b of the bifurcated portion of the changeover lever 12 drives the program ring 3 through the driven pin 11 secured to the program ring 3. Thus, the angular position of the program ring 3 is precisely determined by the angular position of the lens aperture control ring 1. Accordingly, the structure of the present invention insures more accurate and smooth rotation of the program ring 3, than in the case of the known electric eye camera having a program ring connected to a lens aperture control ring through a spring.

Furthermore, in the electric eye camera, according to the present invention, when the changeover ring 13 is turned to the position for the programmed exposure control mode of operation, the shutter speed ring 16 is also turned in conjunction with the changeover ring 13, so that the cam 16b of the shutter speed ring 16 engages with the pin 15 of the shutter delaying mechanism 7. With the pin 15 at the cam 16b, the shutter speed ring 16 is not affected by the shutter delaying mechanism 7.

If a degree rotation of the program ring 3 causes one step change of the shutter speed, through the cam 6 and the pin 15, as well as one step change of the lens aperture, through the lens aperture control ring 1, then it is possible to provide a certain amount of exposure at different angular positions of the lens aperture control ring 1, by modifying the degree of the lens aperture in a proper relation with the change in the shutter speed. During the programmed exposure control mode, the ammeter 27 is also related to the lens aperture control ring 1, and the aperture B of the through-hole means 17a of the front lens aperture ring 17 is used.

By using different apertures, A and B, for the programmed exposure control mode and the automatic exposure control with priority on shutter speed mode, the adjustment for different film sensitivities during the programmed exposure control mode can be done simply by operating a film sensitivity setting means (not shown). Furthermore, during the automatic exposure control with priority on shutter speed the relation between the shutter speed and the film sensitivity, corresponding to the position of the through-hole means 17a, can be adjusted by means of a click joint between the front lens aperture ring 17 and the shutter speed ring 16.

The operation for the flash photographing mode will now be described. The changeover ring 13 is turned to bring the flash mark 25 to the index position 22. Then, the cam 16c of the shutter speed ring 16 engages with the pin 15 of the shutter delaying mechanism 7, so as to set the shutter speed at 1/30 second to carry out flash photographing with such shutter speed. For flash photographing, the solid portion C of the front lens aperture ring 17 is located in front of the photoelectric element 26, and the light beam from the photographic object does not reach the photoelectric element 26 by being interrupted at the front lens aperture ring 17. Thus, the ammeter 27 remains inactuated, and the pointer scanning lever 31 and the ammeter interconnecting lever 32 make full stroke to the lowermost position thereof.

During flash photographing mode, the projected portion 13a of the changeover ring 13 becomes engaged with the lug 1a of the lens aperture control ring 1 in the course of shutter stroke. Thus, the rotation of the lens aperture control ring 1 ends at the position of the projected portion 13a of the changeover ring 13, so as to set the degree of the lens aperture. Since the pointer 27a of the ammeter 27 is not actuated to allow full downward stroke of the pointer scanning lever 31 and the ammeter interconnecting lever 32, the degree of the lens aperture can be determined solely by the angular position of the changeover ring 13.

The projected portion 13a of the changeover ring 13 is so positioned that it does not affect the operation in the programmed exposure control mode and automatic exposure control with priority on shutter speed mode.

Figure 3:
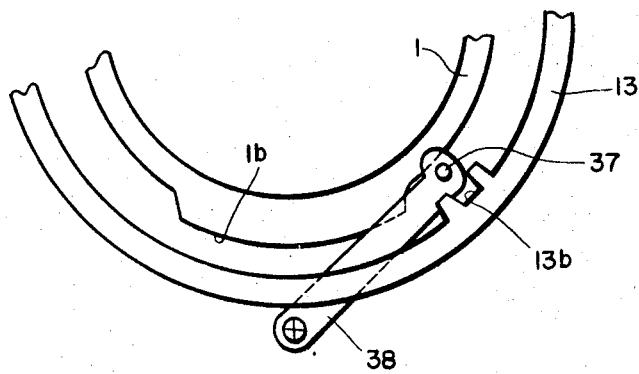
FIG. 3 is a schematic view showing the relation between a lens aperture control ring and a changeover ring.

Furthermore, the electric eye camera according to the present invention has a means to prevent misoperation. As shown in FIG. 3, the lens aperture control ring 1 has a projected portion 1b, and as soon as the lens aperture control ring is turned away from its initial position, a safety pin 37 secured to a safety lever 38 is forced away from the center of the changeover ring 13 by the engagement with the projected portion 1b of the lens aperture control ring 1. During the programmed exposure control mode, a recess 13b formed on the inner periphery of the changeover ring 13 is engageable with the thus moved safety pin 37, so as to inhibit changeover from the programmed exposure mode to any other mode, as long as the lens aperture control ring 1 is moved away from the initial position thereof. As a result of it, the chance of misoperation can be eliminated and one of the causes of trouble is removed.

As described in the foregoing, with the particular embodiment of the invention as illustrated in FIGS. 1 to 3, by a simple operation of the changeover ring 13 alone, selection can be made among programmed exposure control mode, automatic exposure control with priority on shutter speed mode, and flash photographing. The accuracy and smoothness of the programmed exposure control mode operation can be materially improved, as compared with those of known electric eye cameras. Moreover, when the lens aperture control ring 1 is displaced from its initial position, the changeover ring 13 cannot be moved from the position for programmed exposure control mode, and hence changeover of operative mode cannot occur when the driven element 10 engages with the cam 8 of the lens aperture control ring 1. Thus, the chance of misoperation is eliminated.

In the automatic exposure control means of the electric eye camera according to the present invention, an ammeter is used to regulate both the shutter speed and the degree of lens aperture in accordance with a predetermined program, in the case of programmed exposure control mode of operation, and (2) to regulate the degree of lens aperture alone with a selected shutter speed, in the case of automatic exposure control with priority on shutter speed mode of operation. It is preferable to inform a photographer of the light value of the object being photographed, in the case of programmed exposure control, or of the degree of lens aperture, in the case of automatic exposure control with priority on shutter speed. Then, the data including the light value and lens aperture can be recorded for each photograph, and also the photographer can be warned of insufficient brightness of the object, if it is too dark for the film being used.

According to another embodiment of the present invention, an electric eye camera is provided, which is not only capable of programmed exposure control and automatic exposure control with priority on shutter speed, but also light values and the degree of lens aperture can be selectively indicated in the field of range finder by using the indication of an ammeter. Thereby, in the case of programmed exposure control, the light value is given and warning of insufficient brightness of the photographic object is given, while in the case of automatic exposure control with priority on shutter speed, the degree of lens aperture is given and improper setting of shutter speed for a given brightness of the photographic object can be warned to allow readjustment of the shutter speed. The range of automatic lens aperture control for a given shutter speed, which is available for automatic exposure control with priority on shutter speed mode of operation, is usually not very wide. If the photographer adjusts the shutter speed in order to use a predetermined degree of lens aperture, as indicated in the view finder, then the priority is actually given to the lens aperture, and such mode of operation becomes possible with the aforesaid indication.

Figure 4:
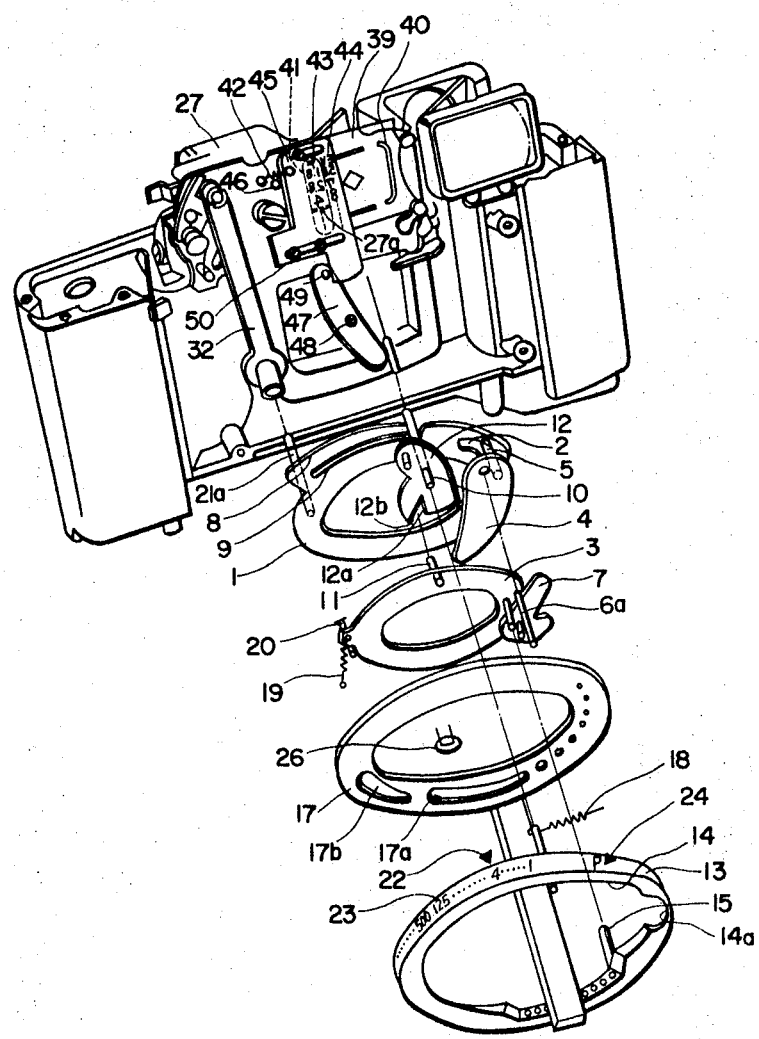
FIG. 4 is an exploded perspective view of a device for changing over the indication in the field of a view finder, mountable in the electric eye camera of FIG. 1.
Figure 5:
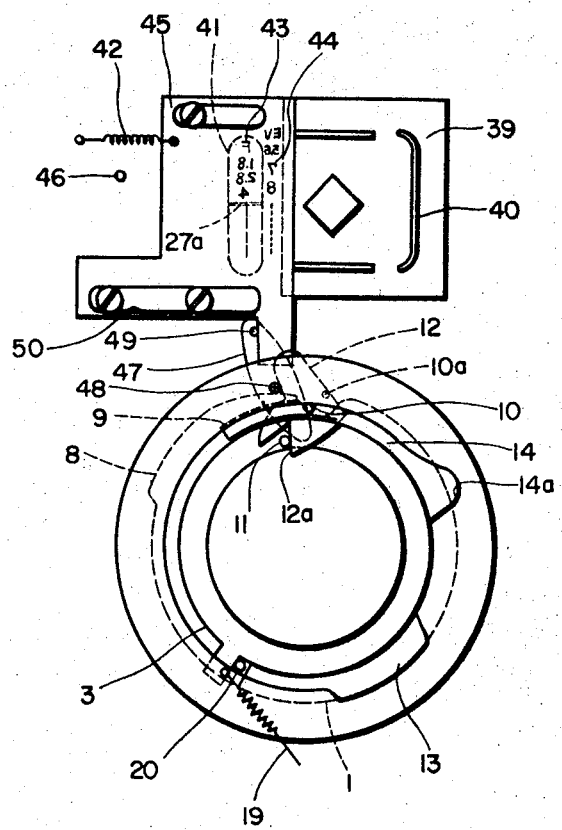
FIG. 5 is a partial front view of the device of FIG. 4.

FIGS. 4 and 5 illustrate such embodiment of the present invention. Referring to the FIGS., a device for changing over the indication in the view finder will now be described. An actuating pin 6a is mounted on a program ring 3. A front lens aperture ring 17 having apertures 17a and 17b is coupled to a changeover ring 13 through a suitable click means (not shown). An exposure interconnecting pin 21a is related to an exposure meter 27 through a known means including another interconnecting lever 32. A view finder frame plate 39 has a view finder frame 40 and a through-hole 41 formed thereon, and suitable correction for parallax is made on the view finder by a known method. A view finder indication changeover plate 45 has a series of graduations 43 for lens aperture degree and another series of graduations 44 for light values, and the changeover plate 45 is pulled toward a stopper 46 by a spring 42. A finder changeover lever 47 is pivotally supported by a stationary shaft 48, and a pin 49 is secured to the lever 47 so as to move the view finder indication changeover plate 45, depending on the operative position of a driven element 10. The view finder indication changeover plate 45 has slits 50 slidably fitted to suitable guide pins.

For automatic exposure control with priority on shutter speed, the changeover ring 13 is turned to bring a shutter speed mark inscribed thereon to an index point. Then, a pin 15 secured to the changeover ring 13 engages with a shutter delaying mechanism 7, so as to set the shutter speed. With the changeover ring 13 held at the position as illustrated in FIGS. 4 and 5, the inner cam surface of the ring 13 acts to depress the driven element 10 to a position engageable with an escape groove 9 of the lens aperture control ring 1. One arm 12a of the bifurcated portion of a changeover lever 12 tends to turn the program ring 3 in a counterclockwise direction by the engagement of the arm 12a and a driven pin 11 secured to the program ring 3. Thus, the program ring is urged against a stopper 20, so as to be held at its initial position. Accordingly, rotation of the lens aperture control ring 1 does not actuate the program ring 3, and the actuating pin 6a will not actuate the shutter delaying mechanism 7.

As in the case of the preceding embodiment, under such conditions, only the lens aperture control ring 1 is driven by the exposure meter 27 through suitable interconnecting means, such as levers 32 and 21a, so as to automatically set the degree of lens aperture, depending on the brightness of the photographic object. When the driven element 10 engages with the escape groove 9, it forces the changeover lever 47 to rotate clockwise against the elastic force of the spring 42, as shown in FIG. 5, so that the view finder indication changeover plate 45 is moved rightwards, to allow viewing of the graduations 43 of the degree of lens aperture through the slit 41 of the changeover plate 45. Thus the degree of lens aperture, as determined by the angular displacement of the pointer 27a of the exposure meter, can be indicated in the view finder. To modify the shutter speed, the front lens aperture ring 17 is manually turned, so as to actuate the shutter delaying mechanism 7 in a known manner. If necessary, such manual adjustment of the shutter speed can be made to achieve the desired degree of lens aperture, while inspecting the view finder.

For programmed exposure control mode of operation, the changeover ring 13 is turned to bring a program mark 24 inscribed thereon to the index position 22. Then, the engagement of the pin 15 with the shutter speed delaying mechanism 7 is released, and the driven element 10 engages in a recessed portion 14a of the inner cam 14 of the changeover lever 13, so as to be moved to a position 10a, as shown in FIG. 5. Accordingly, the driven element 10 is removed from the changeover lever 47, and the spring 42 forces the lever 47 to rotate counterclockwise, and the view finder indication changeover plate 45 is moved leftwards until it engages with the stopper 46. Thus, a photographer can see the graduations 44 of the light values through the slit 41 of the changeover plate 45, and the quantity of light, as determined by the pointer 27a of the exposure meter 27, is indicated in the field of the view finder.

The driven element 10, located at the position 10a of FIG. 5, is engageable with the cam 8, integral with the exposure control ring 1, and as the exposure control ring 1 is rotated by interconnecting levers 32 and 21a, the driven element 10 is so moved by the cam 8 as to rotate the changeover lever 12 counterclockwise. Accordingly, the program ring 3 is turned clockwise by the engagement between the driven pin 11 secured on the ring 3 and the other arm 12b of the changeover lever 12.

As explained in the foregoing, the program ring 3 has the actuating pin 6a engageable with the shutter delaying mechanism 7, and hence, as the program ring 3 is rotated by the changeover lever 12, the shutter speed is automatically modified. The program ring 3 also has an aperture blade 4 pivotally mounted thereto, and the relative movement of the lens aperture control ring 1 with respect to the program ring 3 regulates the degree of lens aperture by using the aperture blade 4. Thus, the degree of the lens aperture is compensated for the modification of the shutter speed by the shutter delaying mechanism 7 caused by the actuating pin 6a. In other words, the angular displacement of the lens aperture control ring for a given light value and for a given film sensitivity is the same both for the programmed exposure control mode of operation and the automatic exposure control with priority on shutter speed mode of operation.

The particular embodiment of the invention, as depicted in FIGS. 4 and 5, is capable of both the programmed exposure control mode of operation and the automatic exposure control with priority on shutter speed mode of operation, and in addition, the light value and the degree of lens aperture are selectively indicated in the field of the view finder. Thereby, warning can be given, if the natural brightness of a photographic object is too low for successful photographing. Moreover, as pointed out in the foregoing, the need of shutter speed modification, in the case of automatic exposure control with priority on shutter speed, can be indicated, and if it is desired, exposure control with priority on lens aperture can be achieved.

Figure 6:
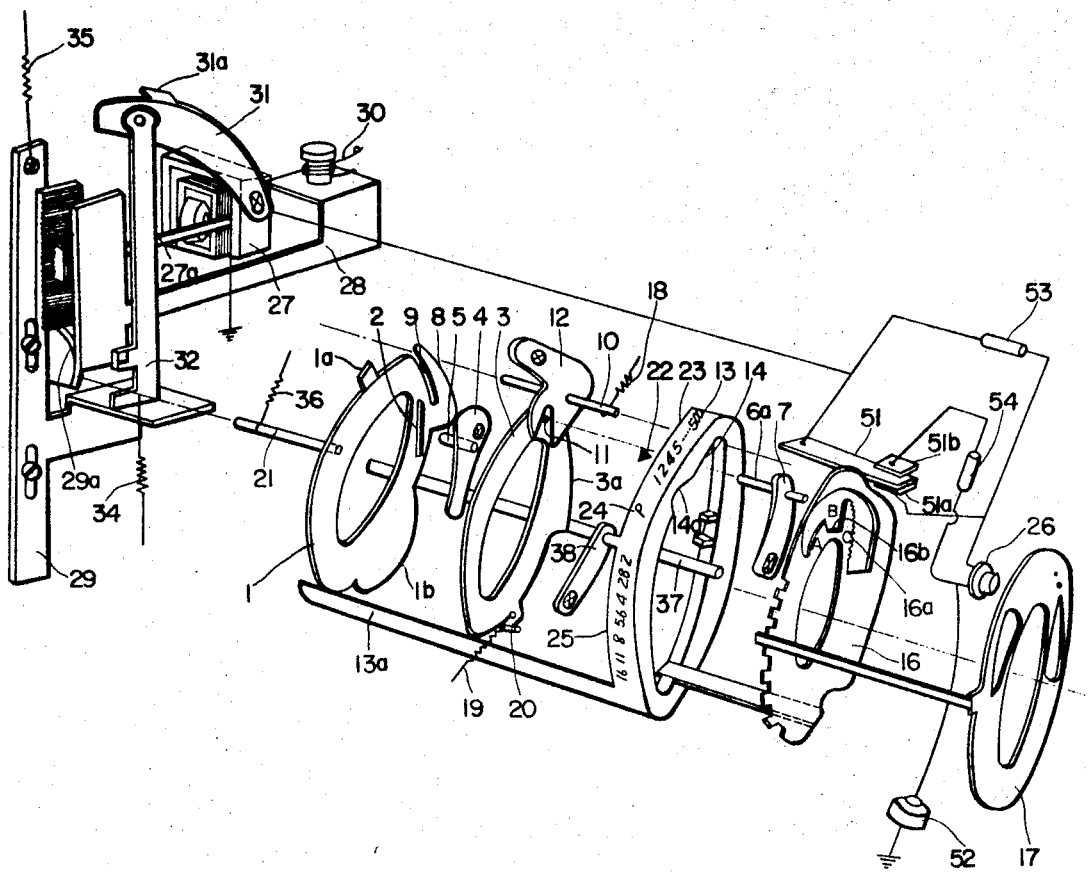
FIG. 6 is an exploded perspective view of an embodiment of the automatic exposure control device, mountable in the electric eye camera according to the present invention.

FIGS. 6 to 15 show a further embodiment of the present invention. Referring to FIG. 6, program ring 3 has a cam portion 3a integrally formed thereon, so as to actuate a shutter delaying mechanism 7 through the cam portion 3a and an actuating pin 6a, during the programmed exposure control mode of operation. A changeover ring 13 has a shutter speed ring 16, integrally secured thereto, and the actuating pin 16a engages a cam portion 16a of the shutter speed ring, so as to set the shutter speed during flash photographing and during the automatic exposure control with priority on shutter speed mode of operation. The changeover ring 13 also has a program mark 24, a shutter speed mark 23, and a flash mark 25 inscribed thereon, so as to select the mode of operation by bringing each of such marks to an index point 22. A front lens aperture ring 17 is coupled to the shutter speed ring 16, through a suitable click means (not shown), which is adapted to regulate the quantity of light being delivered to a photoelectric element 26. An exposure meter 27 is actuated by the output from the photoelectric element 26. The front lens aperture ring 17 also provides for adjustment of the shutter speed for the automatic exposure control with priority on shutter speed mode of operation, and also provides for the adjustment for the sensitivity of the film being used in the case of flash photographing and programmed exposure control mode of operation.

When a shutter release lever 29 is depressed, against the elastic force of a spring 35, the bent portion 29a of the release lever 29 is removed from the free end of an exposure meter point holding lever 28, so that the lever 28 clamps a pointer 27a of the exposure meter 27 by the elastic force of a spring 30 acting on the lever 28. Then, a pointer scanning lever 31 and an exposure meter interconnecting lever 32 are pulled downwards by another spring 34, until the bent portion 31a of the pointer scanning lever 31 engages the pointer 27a, which is then clamped by the pointer holding lever 28. Accordingly, the exposure meter interconnecting lever 32 drives an exposure control ring 1 through an interconnecting pin 21, so as to regulate the degree of lens aperture, until the downward movement of the exposure meter interconnecting lever 32 ends in the aforesaid manner.

A turnover switch 51 is engageable with the shutter speed ring 16, and a contact 51a is actuated during the automatic exposure control with priority on shutter speed mode of operation, while another contact 51b is actuated during flash photographing and programmed exposure control mode of operation. An electric power source, such as a dry cell battery, is used for actuating the exposure meter 27.

Springs 35, 19 and 36 are incorporated in the electric eye camera, so as to return the shutter release lever 29, the program ring 3, and the lens aperture control ring 1, respectively, to their initial position, upon completion of photographing.

Figure 7:
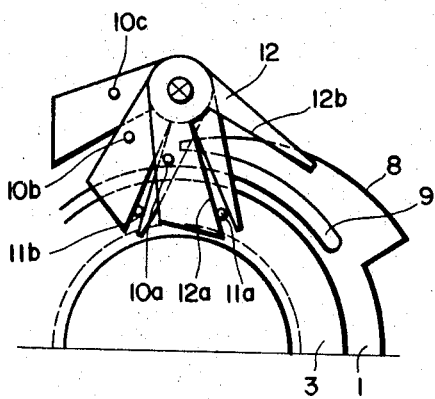
FIG. 7 is a diagrammatic illustration of a device for changeover between programmed exposure control and automatic exposure control with priority on shutter speed.

For automatic exposure control with priority on shutter speed mode of operation, the changeover ring 13 is so turned as to bring the shutter speed mark 23 to the index point 22. Then, the inner cam 14 of the changeover ring 13 forces the driven element 10 to a position 10a, as illustrated in FIG. 7, where the driven element 10 is engageable with the escape groove 9 of the lens aperture control ring 1. One arm 12a of the bifurcated portion of the changeover lever 12 tends to rotate the program ring 3 in a clockwise direction, until the program ring 3 is urged against the stopper 20. Under such condition, even when the lens aperture control ring 1 rotates, the driven element 10 slides through the escape groove 9, and the program ring 3 is not actuated and remains as urged against the stopper 20. Thereby, the shutter delaying mechanism 7 is not affected by the rotation of the lens aperture control ring 1 at all. The portion C of the cam portion 16a of the shutter speed ring 16 engages with the actuating pin 6a to set the shutter speed at a desired value. During the automatic exposure control with priority on shutter speed, the turnover switch 51 does not engage with the projected portion 16b of the shutter speed ring 16, and the contact 51a of the switch is actuated, as pointed out in the foregoing.

For programmed exposure control mode of operation, the changeover ring 13 is turned to bring the program mark 24 to the index point 22. Then, the driven element 10 engages with a recess 14a on the inner periphery of the changeover ring 13, and a spring 18 acts to move the driven element 10 to a position 10b, as shown in FIG. 7, where the driven element 10 is engageable with the cam portion 8 of the lens aperture control ring 1. Since the elastic force of the spring 19 is selected to be larger than that of the spring 18, the driven element 10 is held at the position 10b. As the lens aperture control ring 1 rotates, the changeover lever 12 is rotated clockwise, by the engagement of the driven element 10 with the cam portion 8, so that another arm 12b of the bifurcated portion of the changeover lever 12 acts to rotate the program ring 3 counterclockwise through the driven pin 11. Such rotation of the program ring 3 is transmitted to the shutter delaying mechanism 7 through the cam 3a and the actuating pin 6a. During the programmed exposure control mode of operation, the actuating pin 6a engages with the B portion of the groove 16b of the shutter speed ring 16, and hence, the shutter speed is not changed by the shutter speed ring 16. In this case, the turnover switch 51 engages with the cam portion 16a of the shutter speed ring 16, and the contact 51b is actuated as pointed out in the foregoing.

As explained above, in this particular embodiment, having a structure as illustrated in FIGS. 6 and 7, during the automatic exposure control with priority on shutter speed, the degree of lens aperture is automatically adjusted solely by the rotation of the lens aperture control ring 1, while during the programmed exposure control mode of operation, both the lens aperture control ring 1 and the program ring 3 are rotated to regulate the degree of lens aperture in conjunction with the shutter speed.

Referring to FIGS. 8 to 15, the operation of this particular embodiment of the present invention will now be described in further detail. Let it be assumed that during the automatic exposure control with priority on shutter speed mode of operation, the degree of the lens aperture can be changed from F2 to F22, while during the programmed exposure control mode of operation, the exposure condition is regulated in the range from EV6 (F2, 1/15) to EV17 (F22, 1/250), wherein the term "EV" stands for exposure value or light value.

Figure 9:
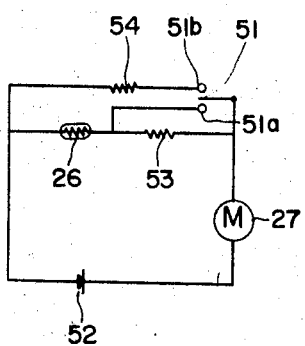
FIG. 9 is an electric circuit diagram, incorporated in the device of FIG. 6.
Figure 10:
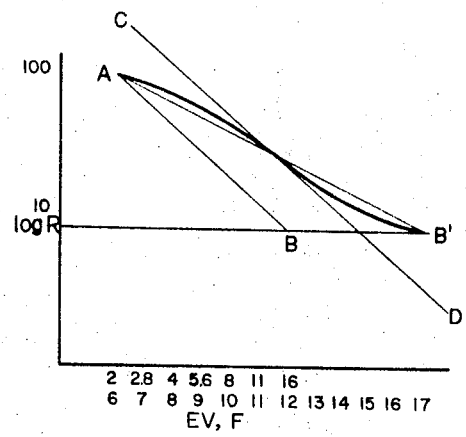
FIG. 10 is a diagram of operative characteristics of a photoelectric element, usable in the electric eye camera, according to the present invention.

During the automatic exposure control with priority on shutter speed mode of operation, referring to the circuit diagram of FIG. 9, the contact 51a of the turnover switch 51 is actuated, so as to shunt a compensating resistance 53. Only the resistance of the photoelectric element 26 is in series with the exposure meter 27. Generally speaking, the relation between the resistance of a photoelectric element and the brightness at the light receiving surface thereof can be represented by a straight line, such as a line $\overline{AB}$ of FIG. 10, when it is plotted on a logarithm-logarithm plane. The inclination of the straight line $\overline{AB}$ is referred to as the $\alpha$ of the photoelectric element. Accordingly, the line $\overline{AB}$ of FIG. 10 represents the specific resistance characteristics of the photoelectric element 26 for different brightness for automatic exposure control with priority on shutter speed mode of operation, which brightness includes the exposure value and the degree of lens aperture.

During the programmed exposure control mode of operation, the contact 51b of the turnover switch 51 is actuated, and the resistances 53 and 54 make significant contribution to the operative characteristics of the photoelectric element 26 and the exposure meter 27. By reducing the $\alpha$ of the photoelectric element 26 to a level, as shown by the line $\overline{CD}$ of FIG. 10, and by selecting proper values of resistances 53 and 54, resistance-brightness characteristics, as shown by the curve $\overline{AB'}$ of FIG. 10, can be achieved. Accordingly, the curve $\overline{AB'}$ of FIG. 10 represents the specific resistance characteristics of the photoelectric element 26 for different brightnesses for the programmed exposure control mode of operation. If the specific resistance characteristics of this case should be linear, as the line $\overline{AB'}$ of FIG. 10, then the actual specific resistance characteristics of the electric eye camera could be also linear, as shown by the straight line of FIG. 8. However, the specific resistance characteristics are, in fact, curved, as represented by the curve $\widetilde{AB}'$. Therefore, if the operative characteristics of the electric eye camera are so built as to coincide with the curve $\widetilde{AB}'$, then very accurate operation can be achieved, during the programmed exposure control mode of operation.

As a result of it, during the automatic exposure control with priority on shutter speed mode of operation, the actual performance is actuated solely by electric circuitry, and the mechanical structure of the camera for such mode of operation can be made very simple.

Figure 8:
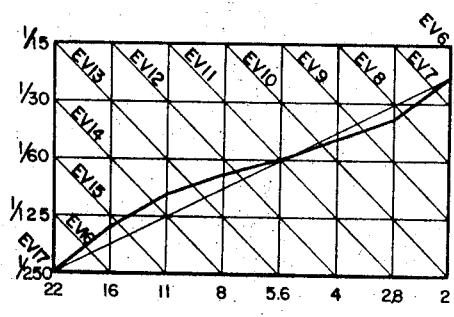
FIG. 8 is a graph illustrating the relation between the degree of lens aperture and the shutter speed, in the automatic exposure control device of FIG. 6.
Figure 11:
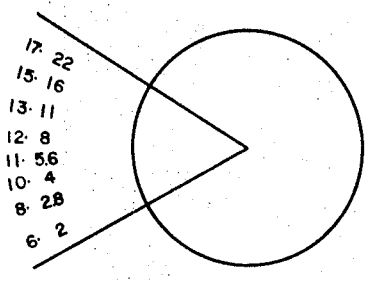
FIG. 11 is a diagrammatic illustration of the angular displacement of the pointer of an ammeter, included in the exposure control device of FIG. 6.

FIG. 11 shows the angular displacement characteristics of an exposure meter for different brightness, which brightness includes the exposure value and the degree of lens aperture. The characteristics of FIG. 11 are useful for both the automatic exposure control with priority on shutter speed mode of operation and programmed exposure control mode of the operation with the operative characteristics as shown in FIG. 8.

Figure 12:
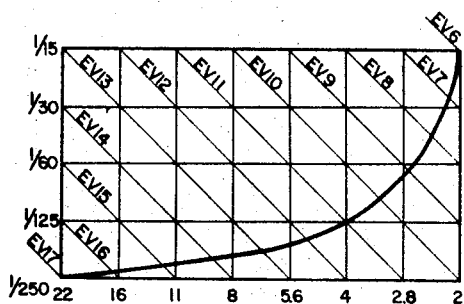
FIG. 12 is a graph showing the relation between the degree of lens aperture and the shutter speed, according to a different program.
Figure 13:
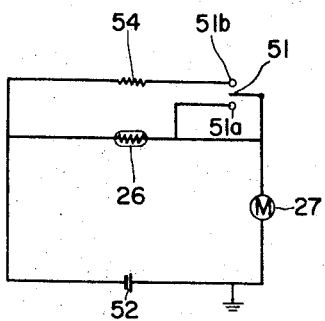
FIG. 13 is a diagram of an electric circuit suitable for providing the programmed control, as illustrated in FIG. 12.
Figure 14:
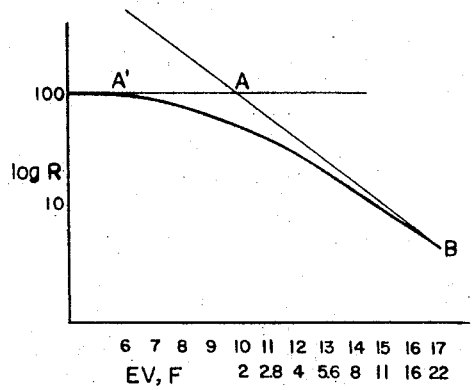
FIG. 14 is a diagram similar to FIG. 10, showing operative characteristics of another embodiment of the electric eye camera according to the present invention.
Figure 15:
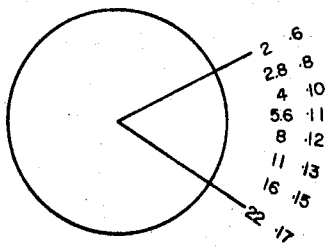
FIG. 15 is a diagrammatic illustration similar to FIG. 11, showing the operative characteristics of another ammeter, usable in the embodiment of FIG. 14.

FIG. 12 shows the operative characteristics of another electric eye camera, according to the present invention, for the programmed exposure control mode of operation. FIG. 13 is a diagram of the circuit of the last mentioned embodiment of the invention, and FIG. 14 shows specific resistance characteristics of a photoelectric element itself and of the photoelectric element combined with compensating elements, for different brightness, including the exposure number and the degree of lens aperture. FIG. 15 is a diagram similar to FIG. 11, showing the operative characteristics of an exposure meter incorporated in the last mentioned embodiment.

For the automatic exposure control with priority on shutter speed mode of operation, the contact 51a of a turnover switch 51 is actuated, to shunt a compensating resistance 54, as shown in FIG. 13. Thus, only the resistance of the photoelectric element 26 is connected in series with the exposure meter 27. Accordingly, the straight line $\overline{AB}$ of FIG. 14 represents the specific resistance characteristics of the photoelectric element 26 for different brightness, for such mode of operation, which brightness includes the exposure value and the degree of the lens aperture.

For the programmed exposure control mode of operation, the contact 51b is actuated to insert the compensating resistance 54 into the circuit of the exposure meter 27. By properly selecting the value of the resistance 54, the operative characteristics as shown by the curve $\overline{A'B}$ of FIG. 13 can be achieved. In other words, the curve $\overline{A'B}$ of FIG. 13 represents the specific resistance characteristics of the photoelectric element combined with the compensating resistance 54 connected thereto, for the programmed exposure control mode of operation. With the characteristics, as shown in FIG. 13, if the electric eye camera is so constructed as to perform the exposure control according to the curve of FIG. 12, then accurate photographing can be made for both the programmed exposure control mode of operation and the automatic exposure control with priority on shutter speed mode of operation.

Referring back to FIG. 6, for flash photographing, the changeover ring 13 is turned, so as to bring the flash mark 25 to the index point 22. Then, the driven element 10 is forced to move to the position 10a, as shown in FIG. 7, by the inner cam 14 of the changeover ring 13. So that the driven element 10 is engageable with the escape groove 9 of the exposure control ring 1. Under such conditions, the changeover lever 12 tends to force the program ring 3 to rotate in a clockwise direction, by the engagement of one arm 12a of the bifurcated portion of the changeover lever 12 and the driven pin 11 secured to the program ring 3. However, the stopper 20 holds the program ring 3, in the state as urged thereto. Furthermore, when the lens aperture control ring 1 rotates, the driven element 10 slides through the escape groove 9 of the lens aperture control ring 1, and the rotation of the ring 1 is not transmitted to the program ring 3, and the latter ring remains stationary. In other words, during flash photographing, the program ring 3 does not affect the operation of the shutter delaying mechanism 7, as in the case of the automatic exposure control with priority on shutter speed mode of operation. With the changeover ring 13 at such position, the C portion of the cam portion 16a of the shutter ring 16 engages with the actuating pin 6a, to set the shutter speed at 1/30 second, so that flash photographing can be done with this shutter speed.

Moreover, during flash photographing, the solid portion of the front lens aperture ring 17 is brought to the front of the photoelectric element 26, so as to interrupt the incident light beams to the photoelectric element, and hence, the pointer 27a of the exposure meter 27 makes the minimum angular displacement to allow full downward stroke of the exposure meter interconnecting lever 32 and the exposure meter pointer scanning lever 31.

When that part of the flash mark 25, which represents the desired degree of lens aperture, is brought to the index point 22, the projected portion 13a becomes engageable with the cooperating projected portion 1a of the exposure control ring 1, and when the exposure control ring 1 is rotated by the exposure meter interconnecting lever 32, the lug 1a engages the projected portion 13a to set the lens aperture at the desired degree.

The lens aperture control ring 1 also has a projected portion 1b, which is adapted to engage with a pin 37, as soon as the lens aperture control ring 1 is rotated. Then, the pin 37 is moved away from the center of the changeover ring 13, by means of a lever 38. During the programmed exposure control mode of operation, the recess 13b formed on the inner periphery of the changeover ring 13 is engageable with the pin 37 when it is actuated by the projected portion 1b, and the changeover ring 13 is locked there. In other words, the changeover ring 13 cannot be moved as long as the pin 37 is engaged with the projected portion 1b. Thus, during the programmed exposure control mode of operation, if the lens aperture control ring 1 is moved away from its initial position, the electric eye camera cannot be changed over to any other mode of operation. Accordingly, the danger of misoperation and troubles caused thereby can be completely eliminated.

Although the present invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. In an electric eye camera including a shutter mechanism for establishing shutter speed and a diaphragm having an aperture therein, the combination comprising a built-in exposure meter, aperture-adjusting means coupled to said meter and responsive thereto for adjusting the size of the diaphragm aperture, a single selecting member manually movable to a first position for automatic control of both the shutter speed and the aperture size and a plurality of second positions respectively corresponding to a plurality of shutter speeds, control means associated with said aperture-adjusting means and movable therewith for adjusting the shutter speed in accordance with a predetermined program, coupling means between said control means and the shutter mechanism and having an engaged condition and a disengaged condition, said selecting member being movable to the first position thereof to engage said coupling means so that movement of said control means in response to movement of said aperture-adjusting means causes corresponding adjustment of the shutter speed, said selecting means being movable to a selected one of said plurality of second positions to select the speed of the shutter and to disengage said coupling means to accommodate independent setting of the aperture size.

2. The electric eye camera set forth in claim 1, and further comprising means for controlling the intensity of light incident from the subject into a photoelectric element for said exposure meter, said light-controlling means having a first electric circuit for controlling the incident light when said selecting member is in the first position thereof, said light-controlling means having a second electric circuit for controlling the incident light when said selecting member is in one of said second positions thereof.

3. The electric eye camera set forth in claim 1, and further comprising means for engaging said selecting member for preventing manual movement thereof when said control means is in condition for adjusting the shutter speed in accordance with the predetermined program.

4. The electric eye camera set forth in claim 1, wherein said exposure meter includes an indicator member and means for maintaining the stroke thereof relatively short, said selecting member being adapted to be manually operated into any one of a plurality of positions for flash photographing wherein the shutter mechanism is set for a predetermined flash shutter speed, said selecting member being coupled to said aperture-adjusting means and operative to limit the stroke of the movement of said aperture-adjusting means when said selecting member is in any one of the flash photographing positions, whereby a selected diaphragm aperture may be set.

5. In an electric eye camera including a shutter mechanism for establishing shutter speed and a diaphragm having an aperture therein, the combination comprising a built-in exposure meter having a photoelectric element, aperture-adjusting means coupled to said meter and responsive thereto for adjusting the size of the diaphragm aperture, a selecting means manually movable to a first position for automatic control of both the shutter speed and the aperture size and a plurality of second positions respectively corresponding to a plurality of shutter speeds, control means associated with said aperture-adjusting means and movable therewith for adjusting the shutter speed in accordance with a predetermined program, coupling means between said control means and the shutter mechanism and having an engaged condition and a disengaged condition, said selecting means being movable to the first position thereof to engage said coupling means so that movement of said control means in response to movement of said aperture-adjusting means causes corresponding adjustment of the shutter speed, said selecting means being movable to a selected one of said plurality of second positions to select the speed of the shutter and to disengage said coupling means to accommodate independent setting of the aperture size, exposure setting means manually adjustable to a first position for automatic exposure control and a second position for semiautomatic exposure control with selected shutter speed.

6. The electric eye camera set forth in claim 5 and further comprising means for controlling light incident on the photoelectric cell in response to the setting of film sensitivity when said selecting member is in the first position thereof, said light-controlling means being adapted to control the light in response to setting both the film sensitivity and shutter speed when said selecting member is in one of the second positions thereof.

7. In an electric eye camera including a shutter mechanism and a diaphragm having an aperture therein and capable of photographing with completely automatic and programmed exposure control as well as semiautomatic exposure control on priority of shutter speed, the combination comprising a built-in exposure meter, means for automatically adjusting the diaphragm aperture depending on the indication of said meter, said aperture-adjusting means having a ring provided with a protruded cam and an arcuate escape groove formed therebetween and concentric with said ring, means for actuating the shutter mechanism with a desired time delay, said shutter actuating means being in the form of a pivoted lever having a follower pin adapted to engage with said programming ring cam, changeover means adapted to be manually operated into a position for programmed exposure control or into a plurality of positions for shutter speed control, said changeover means being in the form of a ring having two cams with either of which the other end of said rockable member pin may engage depending on the angular position of said changeover ring, said changeover ring having a coaxially and integrally connected ring for shutter speed setting and having two cam areas, programming means having a predetermined program for automatically adjusting the shutter mechanism, said programming means comprising a ring having a pin thereon and a cam, and a bifurcated rockable member having a follower pin and embracing said programming ring pin between the two legs thereof so that one end of said rockable member pin may engage in said arcuate groove or with said cam of the aperture-adjusting ring depending on the angular position of said rockable member, whereby when said changeover ring is in any one of said shutter speed control positions, one of said changeover ring cams may urge said rockable member into a position where said rockable member pin may engage in said escape arcuate groove so that angular movement of said aperture-adjusting ring effects no influence to said rockable member and said shutter speed setting ring may be brought into a position where said shutter actuating lever pin engages in one of said cam areas of the shutter speed setting ring for corresponding setting a desired shutter speed, while when said changeover ring is in the programmed exposure control positions, the other cam thereof may urge said rockable member to take a position where said rockable member pin may engage with said aperature-adjusting ring cam so that the angular movement of said aperture-adjusting ring causes angular movement of the bifurcated rockable member and in turn rotation of said programming ring which sets said shutter actuating lever at programmedly corresponding shutter speed.

8. A camera as set forth in claim 7 further comprising;
   a light intensity controlling ring having two window areas respectively so shaped that the intensity of light incident from the subject into the photoelectric element may be adjusted depending on the film sensitivity respectively for programmed exposure control and semiautomatic exposure control on priority of shutter speed, and further having an axially extending bar;
   said shutter speed ring having click-stop positions to engage with said bar so that the light intensity may be adjusted further depending on the set shutter speed for semiautomatic exposure control.

9. A camera as set forth in claim 8 further comprising;
   a first electric circuit for the exposure meter having a fixed contact and adapted to be used in case of the semiautomatic exposure control on priority of shutter speed;
   a second electric circuit having a fixed contact and compensating resistances so as to be used in case of the programmed exposure control;
   a movable contact for switching from said first circuit to said second circuit or vice versa;
   said shutter speed ring further having a cam to engage with said movable contact so that the manual operation of said control ring and consequently the movement of said shutter speed ring fixedly connected thereto causes said electrical switching operation.

10. A camera as set forth in claim 7 in which; there is provided a bar axially extending between said aperture-adjusting ring and said changeover ring, and supported by a lever pivoted to the camera body so as to be radially rockable;
    said aperture adjusting ring further having a cam so as to engage with one end of said bar thus urging the same radially outward when said aperture-adjusting ring is not in the normally situated angular position;
    said changeover ring has a notch so located that engagement of the other end of said bar in said notch when said bar is urged radially outward prevents said changeover ring from being rotated from the programmed exposure control positioned to the semiautomatic control position.

11. A camera as set forth in claim 7 in which;
    said aperture-adjusting ring further has a lug;
    said changeover ring further has a coaxially extending bar;
    said shutter speed setting ring further has a third cam area;

whereby when said changeover ring is brought into any one of said flash photographing positions, said shutter speed ring is angularly moved together therewith to have said shutter actuating lever pin engaged in said third cam area for setting the shutter speed for flash photographing, and said bar abuts said lut to limit the aperture-adjusting ring movement stroke for setting the aperture for flash photographing.

12. A camera as set forth in claim 7 in which;
when said changeover ring is brought into any one of said flash photographing positions, said light intensity controlling ring may be correspondingly angularly moved via said shutter speed ring so that the portion of said light intensity controlling ring where there is no window may be faced toward the photoelectric element whereby the movement of the indicator member of the exposure meter is kept in a considerably smaller stroke.

13. A camera as set forth in claim 7, further comprising;
a viewer frame for showing the photographing area;
an indicator plate member having one area showing the aperture value in the case of the semiautomatic exposure control, and the other area showing the exposure value in the case of the programmed exposure control respectively with cooperation of the exposure meter pointer;
said indicator plate member being adapted to be slidably moved in relation to said viewer frame and so mechanically connected to said bifurcated rockable member pin that when said rockable member pin is engaged in said escape arcuate groove of the aperture-adjusting ring the aperture value can be read at the viewer frame while when said rockable member pin is engaged with said aperture adjusting ring cam formed adjacent to said escape arcuate groove the exposure value can be read.

UNITED STATES PATENT OFFICE
CERTIFICATE OF CORRECTION

Patent No. 3,578,765                Dated May 18, 1971

Inventor(s) Tatsuo Kobayashi and Kayoshi Tsujimoto

It is certified that error appears in the above-identified patent and that said Letters Patent are hereby corrected as shown below:

Column 1, line 71, after "to" insert --the--. Column 5, line 3, after "changeover" insert --ring--. Column 14, line 7, after "member" insert --pivoted on the camera body, said rockable member--.

Signed and sealed this 2nd day of November 1971.

(SEAL)
Attest:

EDWARD M. FLETCHER, JR.      ROBERT GOTTSCHALK
Attesting Officer              Acting Commissioner of Patents